United States Patent
Wallgren

(10) Patent No.: US 8,857,532 B2
(45) Date of Patent: Oct. 14, 2014

(54) METHOD AND DEVICE FOR POSITION LOCKED POWER TOOL OPERATION FOR CORRECTION OF UNACCEPTABLE SCREW JOINT TIGHTENING RESULTS

(75) Inventor: Carl Johan Erik Wallgren, Stockholm (SE)

(73) Assignee: Atlas Copco Industrial Technique Aktiebolag, Stockholm (SE)

(*) Notice: Subject to any disclaimer, the term of this patent is extended or adjusted under 35 U.S.C. 154(b) by 672 days.

(21) Appl. No.: 13/128,013

(22) PCT Filed: Nov. 6, 2009

(86) PCT No.: PCT/SE2009/000488
§ 371 (c)(1),
(2), (4) Date: May 18, 2011

(87) PCT Pub. No.: WO2010/053422
PCT Pub. Date: May 14, 2010

(65) Prior Publication Data
US 2011/0214890 A1   Sep. 8, 2011

(30) Foreign Application Priority Data
Nov. 7, 2008   (SE) ........................................ 0802355

(51) Int. Cl.
*B25B 23/14* (2006.01)
*B25B 23/147* (2006.01)

(52) U.S. Cl.
CPC ............... *B25B 23/147* (2013.01); *B25B 23/14* (2013.01)
USPC ..................................... 173/1; 173/20; 81/52

(58) Field of Classification Search
USPC .................... 173/1, 20; 81/57.1, 52
See application file for complete search history.

(56) References Cited

U.S. PATENT DOCUMENTS

| | | | |
|---|---|---|---|
| 3,124,976 A * | 3/1964 | Pittwood | 408/3 |
| 4,562,756 A | 1/1986 | Otsuki et al. | |
| 4,787,136 A | 11/1988 | Majic | |
| 5,125,151 A * | 6/1992 | Smart | 29/706 |
| 6,711,972 B1 * | 3/2004 | Joyner et al. | 81/57.4 |
| 6,928,332 B2 * | 8/2005 | Gass | 700/108 |
| 2002/0184973 A1 | 12/2002 | Castanon | |

FOREIGN PATENT DOCUMENTS

EP   0 399 637 A1   1/1990

OTHER PUBLICATIONS

International Search Report dated Feb. 17, 2010 issued in International Appln. No. PCT/SE2009/000488.

* cited by examiner

*Primary Examiner* — Michelle Lopez
(74) *Attorney, Agent, or Firm* — Holtz, Holtz, Goodman & Chick PC

(57) ABSTRACT

A method and a device are provided for locking the operation of a power wrench to the location of an unacceptably tightened screw joint or object with a sensor for at least one tightening parameter. A position sensing system is provided for indicating continuously the position of the power wrench during tightening operations, and a control unit includes a unit for comparing obtained tightening parameter values with predetermined limit values and to provide an OK or a NOK signal in response to those limit values being passed or not for each screw joint. A locking device is provided to lock the power wrench operation to the very position of the screw joint or the object for which a NOK signal has been issued until the unacceptably tightened screw joint has been attended to and the NOK signal is removed.

13 Claims, 1 Drawing Sheet

METHOD AND DEVICE FOR POSITION LOCKED POWER TOOL OPERATION FOR CORRECTION OF UNACCEPTABLE SCREW JOINT TIGHTENING RESULTS

This application is a U.S. National Phase Application under 35 USC 371 of International Application PCT/SE2009/000488 filed Nov. 6, 2009.

BACKGROUND OF THE INVENTION

The invention relates to a method and a control device for position locking of a torque delivering power tool to a certain screw joint or assembled object for guaranteeing correction of an unacceptable screw joint tightening result before moving to the next screw joint or object.

In particular, the invention concerns a method and a control device for a screw joint tightening power tool and by which the power tool operation is locked to the very object or position on the object in which an unacceptable tightening result has been indicated, thereby making sure that a correction of an unacceptably tightened screw joint is not neglected.

A problem occurring at assembly line screw joint tightening is that unacceptably tightened screw joints now and then is left in that state without being corrected. Due to stress and/or lack of attention operators may leave screw joints as acceptably tightened despite the power wrench system has indicated NOK (not o.k.). This error indication means that there is some faulty with a screw joint or with the power wrench, and that a desired tightening level has not been reached and that the obtained tightening result does not lie within acceptable angle and/or time limits. A screw joint which has not been acceptably tightened may result in a weaker assembly with hazardous results at future use, for instance a break down of safety critical parts of a motor car. A NOK indication should result in correction measures being taken including checking the screw joint for damaged parts and/or checking the power wrench for malfunction, and followed by exchange of damaged screw joint parts and/or shifting to a properly functioning power wrench and retightening of the screw joint to an acceptable result.

BRIEF SUMMARY OF THE INVENTION

It is an object of the invention to provide a device for increasing quality on objects assembled by screw joints by forcing the operator to attend to an erroneously tightened screw joint before moving to the next screw joint or object, thereby guaranteeing that an unacceptably tightened screw joint is not left unattended and that the assembled object gets a proper quality.

Further objects and advantages of the invention will appear from the following specification and claims.

A preferred embodiment of the invention is described below with reference to the accompanying drawing.

DETAILED DESCRIPTION OF THE INVENTION

Figure 1:
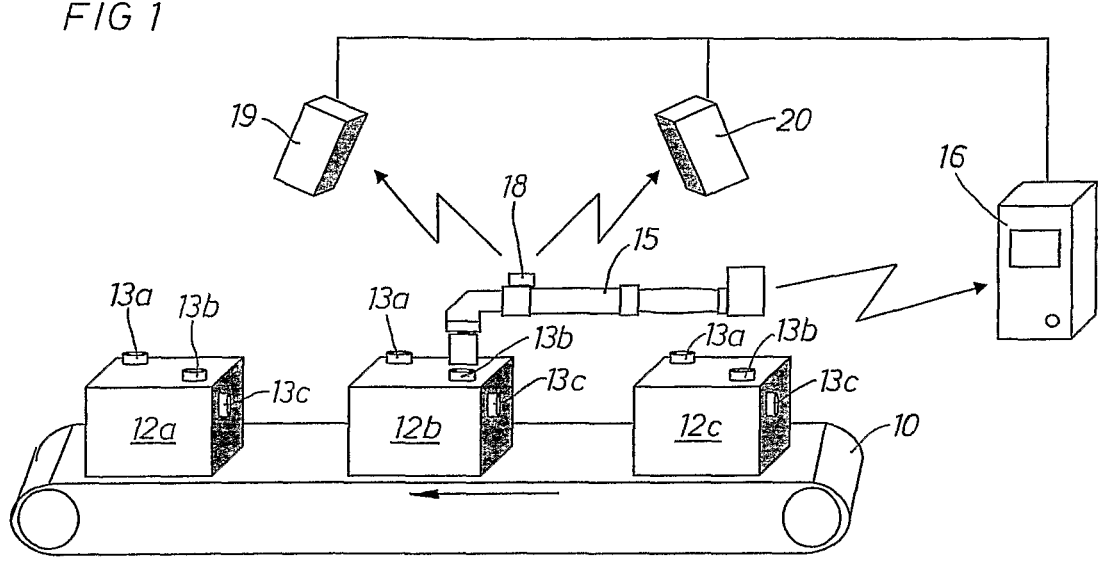
FIG. 1 shows a schematic view of an assembly line carrying objects with screw joints to be tightened by a power wrench with contact free position indicating means.

The arrangement shown in FIG. 1 comprises an assembly line with a moving object carrier 10, three identical objects 12a,b,c supported on the carrier 10 each comprising three screw joints 13a,b,c located in different positions on the objects 12a,b,c and intended to be tightened by a power wrench 15. The illustrated power wrench 15 is a portable battery powered tool having R-F transceiver means for communicating via radio waves with a stationary operation control unit 16. The power wrench 15 comprises at least one tightening parameter sensing device, for instance a torque transducer or an angle encoder, for reporting back to the control unit 16 the actual parameter values of each tightening operation.

The power wrench 15 is provided with an identity providing means in the form of a RFID tag 18 which is recognised by two stationary position scanning devices 19,20, wherein the RFID tag 18 and the scanning devices 19,20 form a position sensing system. The scanning units 19,20 are connected to the control unit 16 and arranged to transfer signals indicating the actual three dimensional position of the power wrench 15. The control unit 16 is arranged to indicate continuously the position of the power wrench 15 during operations at the assembly line. Since the assembly line comprises a moving object carrier 10 the control unit 16 is programmed to compensate for that movement.

The control unit 16 is programmed with target torque levels for each one of the screw joints 13a,b,c as well as limit values for tightening angle and/or spent time for each screw joint 13a,b,c. This means that for each tightening operation the control unit 16 will provide an OK or NOK indication telling whether the tightening result of each screw joint 13a,b,c is acceptable or not, i.e. whether the final torque level meets the target level and the angle and time indications lie within the limit values. Some fault with the screw joint or malfunction of the power wrench 15 may be the cause for a NOK indication.

It is important that a non-acceptable tightening result is indicated and that the faulty screw joint or malfunctioning power wrench is attended to before the power wrench 15 is moved to the next screw joint or to the next object. Therefore, the control unit 16 comprises a means by which the power wrench operation is locked to the very position indicated for the screw joint and object for which the NOK tightening is indicated. The control unit 16 could be programmed to initiate locking of the power wrench 15 for operation on that particular screw joint only for which a NOK signal has been generated. This locking is maintained until the error causing fault has been removed and an OK signal has been issued. Alternatively, the control unit 16 could be programmed to allow power wrench operation on the other screw joints on the same object as the NOK indicated screw joint, but to lock the power wrench against operation on other objects. This will force the operator to attend to a faulty screw joint or malfunctioning power wrench before moving to the next screw joint or object. The position locking of the power wrench to a NOK indicated screw joint or object prevents erroneously assembled objects to be left unattended and will guarantee an improved quality of the object leaving the assembly line.

Figure 2:
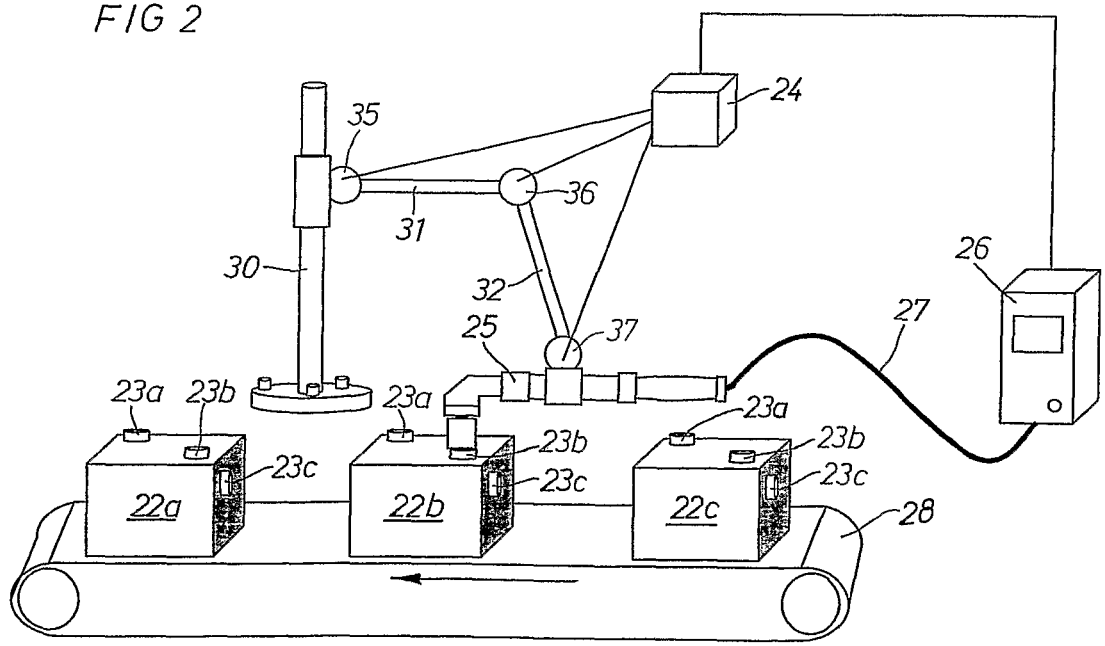
FIG. 2 shows a similar view as FIG. 1 but illustrates a power wrench with a mechanical support and position indicating means.

In FIG. 2 there is illustrated an alternative embodiment of the invention wherein a power wrench 25 is connected to an operation control unit 26 via a cable 27 for power and signal transfer. As in the above described embodiment three object 22a,b,c with three differently located screw joints 23a,b,c on each are supported on a moving assembly line carrier 28.

In contrast to the arrangement illustrated in FIG. 1 the power wrench 25 is supported by a mechanical arm comprising a stationary pillar 30 and two pivotally connected links 31,32, whereof the inner link 31 is connected to the pillar 30 and outer link 32 is connected to the power wrench 25. In the pivot points between the two links 31,32, between the inner link 31 and the pillar 30 and between the outer link 32 and the power wrench 25 there are provided angle sensing devices 35,36,37 which generate signals in response to the actual angular positions of the links 31,32 and the power wrench 25.

The angle sensing devices 35,36,37 are connected via cables to a signal treating unit 24 which in turn is connected to the operation control unit 26. The individual multi-dimensional position of the power wrench 25 is continuously indicated, and in case of a NOK signal in a certain screw joint position the control unit 26 register that very position and locks the power wrench operation to that very screw joint position or to the position of the object on which a NOK position is indicated. As in the above described embodiment of the invention the position locking of the power wrench serves to prevent unacceptably tightened screw joints and objects containing such screw joints to pass the assembly line unattended.

An important advantage provided by the method and device according to the invention in view of prior art is that the position of the power wrench is continuously indicated, and only when a NOK indication is generated for a certain screw joint position that particular position is registered. Accordingly, no pre-programming of screw joint positions is necessary.

It is to be observed that the embodiments of the invention are not limited to the above described examples but may be freely varied within the scope of the claims. For instance, the above mentioned method to communicate signals wirelessly between the power wrench and the control unit may be carried out by any available communication system, and the communication between the position scanning devices and the power wrench identification device is not limited to the use of an RFID tag but may be carried out by means of any suitable system available today. In some applications the control unit may be incorporated in the power wrench itself, whereby signal communication via radio frequency or cable with stationary equipment will not be required.

The invention claimed is:

1. A control device for a power wrench arranged to prevent negligence of at least one unacceptably tightened screw joint on an assembled object, the power wrench comprising at least one operation parameter indicating unit, and the control device comprising:
    a position sensing system configured to continuously indicate an actual multi-dimensional position of the power wrench during tightening of the at least one screw joint on the object to be assembled; and
    a control unit configured to compare obtained operation parameter values indicated by said at least one operation parameter indicating unit at each tightening operation with predetermined operation parameter limit values, and to issue an OK or an NOK signal indicating whether or not a tightening result of each screw joint is acceptable depending on whether or not said limit values are passed for each screw joint;
    wherein said control unit is configured to lock operation of the power wrench to an object position for which an NOK indicated screw joint tightening result has been indicated, and to enable the power wrench for tightening operations on other objects than the object position for which said NOK indicated screw joint tightening result has been indicated only when said NOK indication is removed.

2. The control device according to claim 1, wherein said position sensing system comprises (i) an identity providing unit located on the power wrench and (ii) at least one stationary position scanning device connected to the control unit and arranged to communicate with said identity providing unit via wireless transmission.

3. The control device according to claim 2, wherein said identity providing unit comprises an RFID tag.

4. The control device according to claim 3, wherein the object is supported on a moving carrier of an assembly line, and the control unit is configured to compensate for movement of said carrier.

5. The control device according to claim 2, wherein the object is supported on a moving carrier of an assembly line, and the control unit is configured to compensate for movement of said carrier.

6. The control device according to claim 1, wherein said control unit is configured to lock the operation of the power wrench to a screw joint position or positions for which a NOK result has been indicated until the NOK indication has been removed.

7. The control device according to claim 6, wherein the object is supported on a moving carrier of an assembly line, and the control unit is configured to compensate for movement of said carrier.

8. The control device according to claim 1, wherein the object is supported on a moving carrier of an assembly line, and the control unit is configured to compensate for movement of said carrier.

9. The control device according to claim 1, wherein said position sensing system comprises a movable arm connected to a stationary structure at one end thereof and to the power wrench at an opposite end thereof, and wherein said arm comprises one or more links interconnected by movable joints each provided with an angle sensor.

10. The control device according to claim 1, wherein the at least one operation parameter indicating unit is configured to indicate at least one of a torque and an angle of a tightening operation of the power wrench on the at least one screw joint on the object to be assembled.

11. A method for ensuring correction of occurring non-acceptably tightened screw joints on objects to be assembled by utilizing a power wrench having at least one operation parameter indicating unit, and a position sensing system for indicating an actual position of the power wrench, the method comprising:
    continuously indicating the actual position of the power wrench during tightening of the screw joints on the objects to be assembled;
    providing a tightening result as indicated by the operation parameter indicating unit in terms of OK and NOK signals indicating whether or not the tightening result of each screw joint is acceptable in relation to predetermined tightening parameter limit values;
    locking operation of the power wrench to an object for which an NOK indication for at least one screw joint of the object has been received, the operation of the power wrench being locked to a screw joint position or positions on the object for which the NOK indication has been received; and
    enabling the power wrench for operation on other objects only when the NOK indication for the at least one screw joint of the object has been removed.

12. The method according to claim 11, further comprising performing position indication via wireless communication between an RFID tag mounted on the power wrench and at least two stationary scanning devices.

13. The method according to claim 11, wherein the tightening result indicated by the operation parameter indicating unit indicates at least one of a torque and an angle of a tightening operation of the power wrench on the at least one screw joint on the object to be assembled.

* * * * *